United States Patent [19]

Tucker, Sr.

[11] 3,879,884
[45] Apr. 29, 1975

[54] DROP-BACK CLIPS AND FISHING APPARATUS

[76] Inventor: Sherman R. Tucker, Sr., 578 Magnolia Ave., Melbourne, Fla. 32935

[22] Filed: Jan. 28, 1974

[21] Appl. No.: 437,402

[52] U.S. Cl.............................. 43/42.72; 43/43.12
[51] Int. Cl............................................. A01k 91/00
[58] Field of Search........................ 43/43.12, 42.72

[56] References Cited
UNITED STATES PATENTS

| | | | |
|---|---|---|---|
| 2,218,946 | 10/1940 | Barnett | 43/42.72 |
| 3,525,173 | 8/1970 | Pickering | 43/42.72 X |
| 3,643,370 | 2/1972 | Cook et al. | 43/43.12 X |
| 3,738,047 | 6/1973 | Tozer | 43/43.12 |
| 3,766,681 | 10/1973 | Mander | 43/43.12 |

Primary Examiner—Louis G. Mancene
Assistant Examiner—Daniel J. Leach
Attorney, Agent, or Firm—Warren E. Ray

[57] ABSTRACT

Nonchafing fishing line drop-back clips with hydrodynamic characteristics having a pair of spring leaves with control domes on the inside of the lower ends for receiving a snap, swivel, leader eye, thong, or bight of a line, a stem joining the leaves with a lateral hole for fishing connectors, and a tension screw for adjusting the force required to withdraw the snap, etc., from between the control domes according to the force required to hold or troll any particular bait or lure. A loop of line or leader material may be used between the drop-back clip ends of such a length as to provide a "drop-back" suitable for hooking the kind of fish in the area. In a modification a thong, which may be used in lieu of the loop, is provided in the form of a flexible strip with one end secured under the tension screw head and the other end releasably clamped between the domes.

12 Claims, 8 Drawing Figures

DROP-BACK CLIPS AND FISHING APPARATUS

BRIEF SUMMARY OF THE INVENTION

This invention relates to drop-back clips for use with various fishing apparatus wherein the fishing line is not subjected to the objectionable crushing or chafing encountered with existing drop-back clips. The control domes on the inside of the lower ends of spring leaves receive the eye of a leader, snap, swivel, thong, or a bight of a line which is relesable upon a predetermined pull controlled by the adjustment of a tension screw between the pair of leaves. A drop-back control loop may be secured to the upper end of the clip and to the lower portion of a fishing line or leader, and is releasably held by a mechanical connection between the control domes. This loop may be of leader material or strong fishing line or shock cord or other elastic material, and of such length as to provide appropriate drop-back for the type of fish in the fishing area. This arrangement is useable with downriggers, downplanes, rods and reels, and hand retrieved fishing lines. A drop-back thong is used in lieu of the drop-back loop when the clip is used in conjunction with outriggers and when mechanically or otherwise mounted directly on a fishing rod or reel, or to any part of a boat, or to a bridge, dock, etc. An end of the thong is secured to the clip by the tension screw while the other end is releasably held between the control domes with the fishing line held loosely within the bend of the thong.

A primary object of the invention is the provision of a fishing drop-back clip wherein the fishing line is not subjected to crushing or chafing.

A particular object is to provide a drop-back clip with hydrodynamic characteristics suited to underwater use in improved versions of trolling, drifting, and stillfishing.

A more particular object is to provide an underwater drop-back clip having a drop-back loop to originate sufficient drop-back strategically at the fishing leader to let fast swimming fish take the baited hook or lure unimpeded by lateral line resistance when striking from the side.

An important object of the invention is to provide a drop-back clip of the aforedescribed nature having a wide scope of versatility to obtain the benefits of the latest drop-back concepts to the use of outriggers, downriggers, downplanes, sinkers, rods and reels, power retrieved lines, and hand lines.

Another object of the invention is to provide a drop-back clip of the aforedescribed nature that is completely adjustable for all size baits, and that can be attached to outriggers by halyards, to rods and reels by foam tapes, elastic bands, etc., to downplanes, downriggers and bottom fishing rigs with snap fasteners, and to fishing leaders and lines by twists and knots in the leaders and lines.

Still yet another object of the invention is the provision of a drop-back clip of the aforedescribed nature with a releasable thong which cooperates with a fishing line to hold or troll all types baits and lures, and to release them as required without crushing, fraying, or chafing the line.

Further objects and advantages of my invention will be apparent from the following detailed description taken in conjunction with the drawing in which:

DETAILED DESCRIPTION

Figure 1:
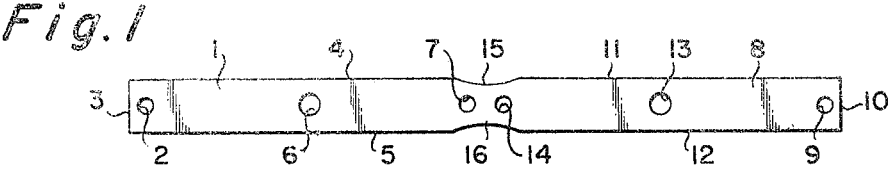
FIG. 1 shows a metal blank from which the drop-back clip may be made by one method.
Figures 2, 3, 4:
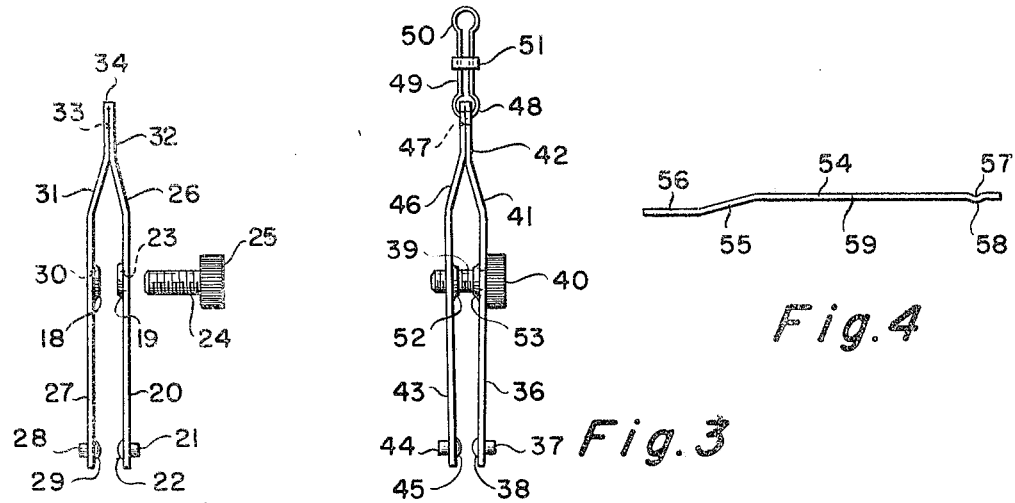
FIG. 2 illustrates a drop-back clip formed from the structure of FIG. 1 or from similar structure.
FIG. 3 is similar to FIG. 2 showing the tension screw in position for adjusting the tension between the control domes, and with the addition of a snap useful in downrigger fishing.
FIG. 4 is a side view of one leaf of a drop-back clip having an inner control dome produced by creating a dimple on the opposite side.

While a metal blank is illustrated in FIG. 1 and one leaf in FIG. 4 of corrosion resistant stainless steel or equivalent, it will be understood that the underwater drop-back clip may be cast integral with a suitable metal or be formed by molding, i.e., by injection molding using a suitable plastic material as one resistant to ultraviolet light. The method of making the drop-back clip or the materials used in the production thereof form no part of this invention. For example, the various holes shown in the metal blank of FIG. 1 may be made initially or after the blank is folded as seen in FIG. 2, but draw punching the central holes desirably leaves some metal for strength and threads. The leaf parts, whether resulting from folding the blank of FIG. 1, or the mating of separate leaves as in FIG. 4, are joined as seen in FIGS. 2–3 by any known method as by spot welding or riveting unless the clip is produced as an integral device by other known methods. The drop-back clip may be used in diverse types of fishing such as trolling, drifting, stillfishing, etc., some of which will be described below.

Turning now to FIG. 1 there is shown a metal blank from which the drop-back clip may be produced. A left leaf 1 with upper edge 4 and a lower edge 5 is provided with a hole 2 in the lower portion near the end 3 for a purpose which will be set forth later in the description. The draw punched or boss reinforced hole 6 in the central part of the left leaf provides threads for the tension screw body which will also be described with respect to other figures. The hole 7 in the upper part of the left leaf 1 will eventually be aligned with the hole 14 in the right leaf 8. The right leaf 8 with an upper edge 11 and a lower edge 12 is also provided with a hole 9 adjacent end 10 and with an enlarged central hole 13, with respect to hole 6 in the left leaf, for passing the body of a tensioning screw, and with an upper hole 14 aligned with hole 7 in the completed drop-back clip. The numerals 15, 16 indicate reduced portions of the leaves as may be desirable when making the drop-back clip from an integral metal blank of such noncorrosive material as stainless steel. It should be noted that the blank of FIG. 1 is only exemplary as the drop-back clip may be made in other ways known in the art.

FIG. 2 illustrates the drop-back clip which may be formed from the structure in FIG. 1 or from similar structure including integral casting either from stainless steel or other metal or from a suitable plastic material. The right leaf 20 is provided with a bowed or curved portion 26 and with an enlarged hole 23 centrally located for passing the threaded body 24 of a tension screw having a thumb screw type head 25. The lower end of the right leaf has a rivet with outer end 21 (exaggerated for purposes of illustration, it being understood that end 21 will be removed approximately at the surface of leaf 20) with an inner dome 22 for engaging the eye of a swivel, snap fastener, or leader, press fitted through a hole such as 9 in FIG. 1. A left leaf 27 quite similar to the right leaf with curved portion 31 is provided with a hole 30 smaller in diameter than the enlarged hole 23 in the right leaf to provide threads for tension screw body 24. A rivet having an outer end 28 and an inner dome 29 is press fitted through a hole as hole 2 in FIG. 1 as is provided for the right leaf 20. The leaves 20, 27 are joined by stem 32 with upper portion 34 having a hole 33 for connecting fishing gear as later described. Assuming that the device of FIG. 2 were made from the blank shown in FIG. 1, the hole 32 would correspond to aligned holes 7, 14, and holes 23, 30 would correspond with holes 13, 6. The tension screw with body 24 and head 25 will be utilized as shown in FIG. 3 to provide a selected tension between the domes. It should be noted that the stem 32, if not produced integrally, corresponds to the upper parts of the leaves of FIG. 1 that are joined by riveting, welding, or any other known method or molding process. Holes 23, 30 are molded with bosses or are draw punched to provide residual material at 19 to restore some of the strength lost by making the hole 23, and at 18 in the left leaf to restore strength and to provide additional thread area.

The drop-back clip in FIG. 3 illustrates the device when the tension screw is utilized to bring the leaves closer together and consequently the domes in touching relationship for the adjustable retention of an eye of a leader, snap, or swivel, etc., as shown in following figures. In this figure the tension screw body 39 with head 40 has been inserted through the enlarged hole in the right leaf and is threaded with the hole in the left leaf so as to bring the leaves and domes 38, 45 in closer proximity to retain the eye of a snap or swivel or other implement with the desired resistance to release. The right leaf 36 with retained metal or boss 53 and curved portion 41 and the left leaf 43 with retained metal or boss 52 and curved portion 46 are joined with stem 42 having a hole 47. A right rivet with outer end 37 and a left rivet with outer end 44 pass through the right leaf 36 and left leaf 43, and end in the domes 38, 45 as in FIG. 2. A conventional fishing snap 49 comprises an openable eye 50, a locking device 51, and a lower eye 48 passing through hole 47 in the stem 42 for purposes as will be described with respect to FIG. 7 for example.

A side view of one leaf is illustrated in FIG. 4 which is indicated by numeral 54. The various holes are not shown since the leaf can be one or the other of the leaves, but it will be understood that the required holes will be provided in the finished product. The blank has a bowed or curved portion 55, a stem 56, and an edge 59 similar to the same elements in FIG. 2. The dome 58 results when a dimple 57 is created by machine on the opposite side or when molded into the part. Suitable leaf halves may be joined by riveting, welding, or by other known mechanical processes to produce a drop-back clip similar to those shown in FIGS. 2–3. Alternatively, as mentioned herinbefore, the drop-back clip may be produced by casting metal or molding a suitable plastic.

Figure 5:
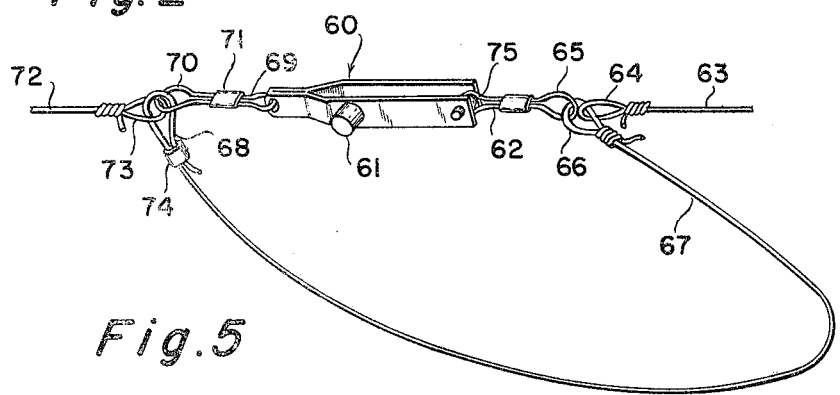
FIG. 5 depicts a drop-back clip with a drop-back loop of shock cord or other elastic material useable with a hand retrieved fishing line.

FIG. 5 depicts the drop-back clip, generally indicated by the numeral 60, as used with a drop-back loop 67 of strong shock cord or other suitable elastic material, for example, in a hand retrieved fishing line. The drop-back clip is provided with the usual tensioning screw with head 61 for adjusting the tension between domes between which is releasably held the upper eye 75 of a fishing snap 62 having a lower eye 65. Fishing line 63 from a fishhook or lure (and associated terminal tackle items) has eye 64, shown knotted here but which could be integral or held with a crimping member, is connected to the drop-back clip via a lower eye 66 in the drop-back loop 67 and the snap fastener eye 65. An upper snap fastener 69 with locking member 71 has an eye 69 passing through an upper hole in the drop-back clip, and an upper eye 70 which receives upper eye 68 of drop-back loop 67 (shown with a locking device 74 in lieu of a knot) that also receives fishing line loop 73 in line 72. This arrangement may be used to improve the hooking of a fish with a hand retrieved fishing line wherein fishing line 72 is fastened to a boat cleat or to a dock piling, bitt, etc., or other device as often done by commercial king mackerel fishermen. The length of the drop-back loop is selected by the angler to provide the required drop-back to allow the striking fish the necessary control of the bait, i.e., to give the striking fish an opportunity to take the lure or baited hook into its mouth or throat before the line snaps tight and sets the hook. Other uses can be made of this arrangement as hereinafter described, and many of the remarks made in connection with FIG. 5 are applicable with respect to FIG. 6 and vice versa.

Figure 6:
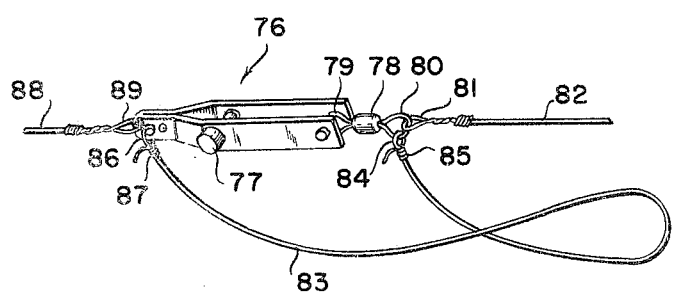
FIG. 6 is similar to FIG. 5 showing use of the device as an underwater drop-back clip.

FIG. 6, somewhat similar to FIG. 5, shows the drop-back clip for use as an underwater device with a standard swivel in lieu of a snap (or leader) and with a drop-back loop. The drop-back clip, generally indicated by the numeral 76, with tension screw having a head 77, is similar to those shown in prior figures. A swivel with body 78, as well known in the art, is provided with an upper eye 79 cooperating with the drop-back clip domes in the usual way and with a lower swivel eye 80 receiving eye 81 in fishing leader 82 and lower eye 84 of drop-back loop 83 of heavy leader material or fishing line (shown with knot 85 which may be replaced with a crimping device or twists). The drop-back loop 83 is of heavier material to increase its visibility and to reduce the lure effect of the drop-back clip to prevent fish from striking the clip. The length of the drop-back loop is selected with regard to the feeding characteristics of particular fish, i.e., whether the fish immediately swallows the bait or runs a short distance before swallowing the bait. The tension between the domes is also selected by the fisherman according to the amount of effort required to releaseably hold the bait or lure. It will be noted that with the initial tug releasing the swivel eye from the domes the fish may run a distance equal to the length of the drop-back loop before encountering line resistance. It will be recognized that water resistance to side motion of the conventional fishing line is eliminated which usual resistance often prevent fish that strike from the side at fast swimming speeds from taking the entire bait into its mouth and throat. Thus, while the drop-back clip prevents bait loss and provides deeper, more effective hooking, the fisherman still has considerable leeway for the exercise of judgment. The fishing line 88 is provided with an eye 89 that passes through an upper hole in the clip along with loop 86 (with knot 87). Eyes 86 and 89 could be interconnected with only one of the eyes passing through the drop-back clip hole or for convenience in selecting varying amounts of drop-back different length drop-back loops 83 may be quickly substituted with the use of terminal snaps (not shown). When the drop-back clip of FIGS. 5–6 is used with a hand line or with rod, reel, and line, it may be called an inrigger release.

Figure 7:
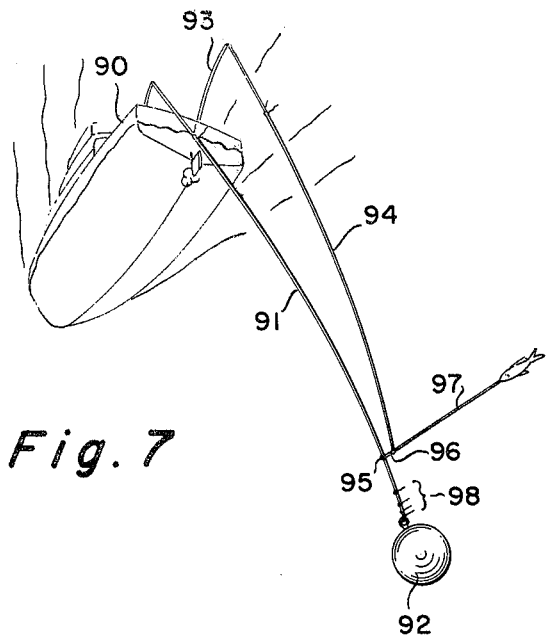
FIG. 7 shows the drop-back clip used with a downrigger or downplane arrangement.

The drop-back clip disclosed in FIG. 3 for example may be utilized in a downrigger fishing arrangement as illustrated in FIG. 7. The fishing boat 90 is provided with a cable or line 91 with weight 92 (or downplane device) as is conventional. The drop-back clip 96 is connected to cable 91 with a suitable snap fastener, i.e., with the snap eye 95 (shown as 50 in FIG. 3) connected to and allowed to slide down the cable with a fishing line 94 from rod 93 connected to the leader 97 with a snap or swivel (or leader eye), one eye being held between the domes of the drop-back clip as is swivel eye 79 in FIG. 6. When boat speed is too slow to take the bait down the cable a small sinker (not shown) is attached to the snap eye. The drop-back loop of FIGS. 5–6 may be omitted in this application since slack in line 94 provides the drop-back. As fish strike the bait the used drop-back clips 98 collect at the weight end of the downrigger cable which may be retrieved for reuse when the supply of clips runs out. As will be noted this arrangement provides the angler with a means for fishing at any desired depth along the downrigger cable and a means to continue fishing simply by adding additional clips after each strike without the necessity of having to continually retrieve the downrigger or downplane. To catch fast feeding "hook spitting" fish the drop-back clip 96 in FIG. 7 may be used with a second drop-back clip with a drop-back loop as shown in FIG. 6 wherein the second clip is fitted with a snap fastener as 71 in FIG. 5, the upper eye 70 of which is inserted in a manner similar to the insertion of snap eye 75 (FIG. 5) between the domes of clip 96 in FIG. 7. In this application the tension between the domes of the second drop-back clip is adjusted for easy release as the fish strikes and the tension between the domes of drop-back clip 96 (FIG. 7) is set for hard release to first set the hook when the drop-back loop of the second clip snaps tight.

Figure 8:
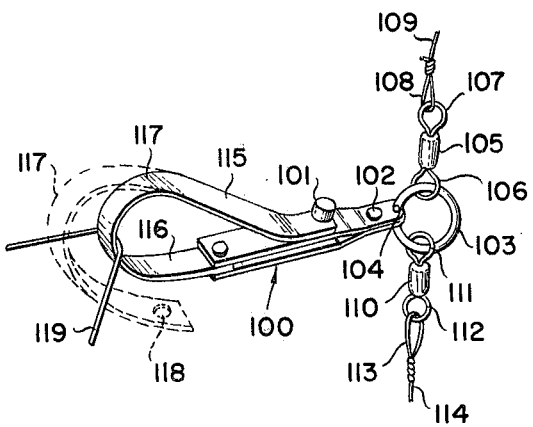
FIG. 8 discloses a drop-back clip provided with a release thong, split ring, and swivels suitable for use with outrigger arrangements.

A modified arrangement, generally indicated by the numeral 100 in FIG. 8 includes the drop-back clip heretofore described with the addition of a release thong 115 which is desirably made of an ultraviolet resistant plastic material that has a low frictional relationship to any fishing line. The thong 115 is provided with a hole (not shown) to hold one end under the tension screw head 101, and with a second chamferred hole 118 at the free end 116 that is inserted between and cooperates with the drop-back clip domes. The thong is curved so as to provide a loop 117 (the released thong being shown in dashed lines) for loosely holding a fishing line 119 until the thong is released by the pull of a striking fish. The function of the thong is to provide a means to hold trolling and live baits in such a manner as to allow the angler to strategically position the bait for the best performance by paying out or reeling in line that slips freely through the looped thong without the usual objectionable crushing and chafing of fishing lines that occurs with popular types of outrigger clips. A rivet 102 is shown for joining the stems of the leaf halves as exemplary of various ways in which this may be accomplished, e.g., spot welding, forming, casting integrally, etc. A split ring 103 or any other known device passes through hole 104 in the drop-back clip stem and receives eyes 106, 111 on upper swivel 105 and lower swivel 110. An upper swivel eye 107 receives the eye 108 of the outhauling portion 109 of an outrigger halyard, and a lower swivel eye 112 receives the eye 113 of the downhaul portion 114 of the outrigger halyard. It will be understood that an outrigger boom projects outboard from a boat dock carrying eyes or pulleys for the halyard to which the drop-back clip is attached indirectly through swivel eyes 107,112. The fishing line 119 is placed in the loop 117 of the thong 115 and is releasably retained therein according to the setting of the tension screw 101 when end 116 of the thong is inserted between the drop-back clip domes. With the drop-back clip so rigged, and adjusted to just hold the bait, any additional pull on the line as from a striking fish, disengages end 116 of thong 115 from between the domes. Thong 115, being flexible, bends backwards thus releasing the line. After release of the thong and consequently the fishing line, a drop-back is automatically provided to allow the fish time and distance in which to swallow the bait before line resistance is encountered at which time the hook may be set in the fish. The result is similar to that provided by the drop-back loops in FIGS. 5–6 or the result obtained by using the drop-back described with respect to FIG. 7. The dome tension is adjusted to hold or troll any size bait and to release upon the additional pull when a fish strikes the bait at which time the end of the thong snaps out of the end of the clip and the line is released, thus providing the desired amount of drop-back.

In summary it will be apparent that a versatile drop-back clip has been disclosed and described with diverse uses in fishing whereby the fishing line or leader is not crushed or chafed in use. The drop-back clip may be used by itself, with drop-back loops, or with a release thong.

While for purposes of description I have shown and described specific embodiments of my invention, it will be apparent that changes and modifications can be made therein without departing from the spirit of my invention or the scope of the appended claims.

I claim:

1. Fishing apparatus comprising a drop-back clip having a bowed left leaf, a bowed right leaf, a stem joining the upper portions of said leaves, a hole in said stem, a pair of domes, one adjacent the distal end of each of said leaves, a threaded hole in the bowed portion of said left leaf, a hole in the bowed portion of said right leaf, a tensioning screw, said screw having a threaded body and a head, said tensioning screw body passing through said hole in said right leaf and engaging the threads in said hole in said left leaf for adjusting tension between said domes, a first fishing implement means including a snap fastener having a lower eye and an upper eye, said lower eye being connected to said hole in said stem, said upper eye being adapted to slidably engage a downrigger line, and a second fishing implement means including a second snap fastener having a lower eye and an upper eye, said upper eye of said second snap fastener being releasably retained between said domes and said lower eye of said second snap fastener being connected to a fishing line.

2. Fishing apparatus according to claim 1 wherein bosses are provided with said threaded hole in the bowed portion of said left leaf and with said hole in the bowed portion of said right leaf for providing additional strength and for additional thread area for said threaded hole.

3. Fishing apparatus comprising a drop-back clip having a bowed left leaf, a bowed right leaf, a stem joining the upper portions of said leaves, a hole in said stem, a pair of domes, one adjacent the distal end of each of said leaves, a threaded hole in the bowed portion of said left leaf, a hole in the bowed portion of said right leaf, a tensioning screw, said screw having a threaded body and a head, said tensioning screw body passing through said hole in said right leaf and engaging the threads in said hole in said left leaf for adjusting tension between said domes, a first fishing inplement means including a snap fastener having a lower eye and an upper eye, said lower eye being connected to said hole in said stem, said upper eye adapted to slidably engage a downrigger line, and a second fishing implement means including a swivel having an upper eye and a lower eye, said swivel upper eye being releasably retained between said domes and said swivel lower eye being connected to a fishing line.

4. Fishing apparatus according to claim 3 wherein bosses are provided with said threaded hole in the bowed portion of said left leaf and with said hole in the bowed portion of said right leaf for providing additional strength and for additional thread area for said threaded hole.

5. Fishing apparatus comprising a drop-back clip having a bowed left leaf, a bowed right leaf, a stem joining the upper portions of said leaves, a hole in said stem, a pair of domes, one adjacent the distal end of each of said leaves, a threaded hole in the bowed portion of said left leaf, a hole in the bowed portion of said right leaf, a tensioning screw, said screw having a threaded body and a head, said tensioning screw body passing through said hole in said right leaf and engaging the threads in said hole in said left leaf for adjusting tension between said domes, a first fishing implement means including a first snap fastener connected to said hole in said stem, a second fishing implement means including a second snap fastener having an upper eye and a lower eye, said upper eye of said second snap fastener being releasably retained between said domes, and a drop-back loop connected to said first snap fastener and to said second snap fastener.

6. Fishing apparatus according to claim 5 wherein said drop-back loop is elastic for absorbing the shock of a striking fish.

7. Fishing apparatus according to claim 5 wherein bosses are provided with said threaded hole in the bowed portion of said left leaf and with said hole in the bowed portion of said right leaf for providing additional strength and for additional thread area for said threaded hole.

8. Fishing apparatus comprising a drop-back clip having a bowed left leaf, a bowed right leaf, a stem joining the upper portions of said leaves, a hole in said stem, a pair of domes, one adjacent the distal end of each of said leaves, a threaded hole in the bowed portion of said left leaf, a hole in the bowed portion of said right leaf, a tensioning screw, said screw having a threaded body and a head, said tensioning screw body passing through said hole in said right leaf and engaging the threads in said hole in said left leaf for adjusting tension between said domes, a first fishing implement means including a leader having an eye connected to said hole in said stem, a second fishing implement means including a swivel having an upper eye and a lower eye, said swivel upper eye being releasably retained between said domes, and a drop-back loop connected to said lower swivel eye and to said hole in said stem.

9. Fishing apparatus according to claim 8 wherein bosses are provided with said threaded hole in the bowed portion of said left leaf and with said hole in the bowed portion of said right leaf for providing additional strength and for additional thread area for said threaded hole.

10. Fishing apparatus comprising a drop-back clip having a bowed left leaf, a bowed right leaf, a stem joining the upper portions of said leaves, a hole in said stem, a pair of domes, one adjacent the distal end of each of said leaves, a threaded hole in the bowed portion of said left leaf, a hole in the bowed portion of said right leaf, a tensioning screw, said screw having a threaded body and a head, said tensioning screw body passing through said hole in said right leaf and engaging the threads in said hole in said left leaf for adjusting tension between said domes, a first fishing implement means connected to said hole in said stem, and a second fishing implement means releasably retained between said domes including a release thong with one end held under the head of said tensioning screw and the other thong end having a hole whereby said other thong end is releasably retained between said domes, said thong having a loop for retaining a fishing line until said thong is released by the force exerted by a striking fish.

11. Fishing apparatus according to claim 10 wherein said first fishing implement means comprises a ring member connected to said hole in said stem, and a pair of connectors engaged with said ring member for attaching the drop-back clip to the halyard in an outrigger fishing arrangement.

12. Fishing apparatus according to claim 11 wherein bosses are provided with said threaded hole in the bowed portion of said left leaf and with said hole in the bowed portion of said right leaf for providing additional strength and for additional thread area for said threaded hole.

* * * * *